United States Patent [19]

Wagener et al.

[11] Patent Number: 4,721,699
[45] Date of Patent: * Jan. 26, 1988

[54] CATALYST FOR THE SEPARATION OF NITROGEN OXIDES FROM COMBUSTION EXHAUST GASES

[75] Inventors: Dietrich Wagener, Essen; Karl H. Laue, Hattingen; Egmar Wunderlich, Mülheim; Theo Sander, Essen; Claus Flockenhaus, Essen; Erich Hackler, Essen; Blagoje Levkov, Wiesbaden; Daniel Grimm, Schlangenbad-Bärstadt; Hartmut Kainer, Wiesbaden; Hermann Stein, Bad Dürkheim, all of Fed. Rep. of Germany

[73] Assignees: Didier-Werke AG, Wiesbaden; Didier Engineering GmbH, Essen, both of Fed. Rep. of Germany

[*] Notice: The portion of the term of this patent subsequent to Jun. 9, 2004 has been disclaimed.

[21] Appl. No.: 900,824

[22] Filed: Aug. 27, 1986

Related U.S. Application Data

[63] Continuation-in-part of Ser. No. 768,508, Aug. 22, 1985, Pat. No. 4,672,052.

[30] Foreign Application Priority Data

Aug. 27, 1985 [DE] Fed. Rep. of Germany ....... 3530544

[51] Int. Cl.$^4$ ............................................. B01J 35/04
[52] U.S. Cl. .................................... 502/439; 502/527; 423/239
[58] Field of Search ....................... 502/527, 338, 439; 423/239 A

[56] References Cited

U.S. PATENT DOCUMENTS

| | | | |
|---|---|---|---|
| 4,044,102 | 8/1977 | Muraki et al. | 423/239 A |
| 4,131,643 | 12/1978 | Utsunomiya et al. | 423/239 A |
| 4,282,115 | 8/1981 | Atsukawa et al. | 423/239 A |
| 4,446,250 | 5/1984 | Niwa et al. | 502/527 X |

*Primary Examiner*—W. J. Shine
*Attorney, Agent, or Firm*—Nils H. Ljungman

[57] ABSTRACT

A structure made from catalyst for use in the separation of nitrogen oxides from combustion exhaust gases which contain dust. The catalytic structure has plates with spaces therebetween to carry a flow of the exhaust gas therethrough. The catalyst is constructed of individual ceramic plates. The abrasion or wear resistance of the plates is chosen such that the dust in the exhaust gases flowing through the spaces abrades the plate surface at a rate which is at least equivalent to the deactivation of the catalyst surface by action of the nitrogen oxides, which constantly provides a fresh catalyst surface for reaction with the nitrogen oxides. The movement of the exhaust gas through the catalytic structure carries the dust and abraded material along with it and out of the structure.

18 Claims, 8 Drawing Figures

CATALYST FOR THE SEPARATION OF NITROGEN OXIDES FROM COMBUSTION EXHAUST GASES

This application is a continuation-in-part of application Ser. No. 768,508, filed on Aug. 22, 1985, now U.S. Pat. No. 4,672,052, entitled "Catalyst for Removal of Nitrogen Oxides from Exhaust Gases", which corresponds to Federal Republic of Germany Patent Application No. P 34 30 886.5, filed on Aug. 22, 1984;

CROSS-REFERENCE TO CO-PENDING APPLICATIONS

Co-pending application Ser. No. 768,417, filed on Aug. 22 1985, now U.S. Pat. No. 4,656,148, entitled "Method and Apparatus for the Reactivation of a Catalyst", which corresponds to Federal Republic of Germany Patent Application No. P 34 30 887.3, filed on Aug. 22, 1984; co-pending application Ser. No. 768,418, filed on Aug. 22, 1985, entitled "Process for Cleaning an Exhaust Gas", which corresponds to Federal Republic of Germany Patent Application No. P 34 30 870.9, filed on Aug. 22, 1984; co-pending application Ser. No. 860,306, filed on May 6, 1986, entitled "Process for the Removal of Nitrogen Oxides and Soot from Exhaust Gases of Machines and Combustion Installations Burning Heavy Fuel Oil", which corresponds to Federal Republic of Germany Patent Application No. P 35 16 359.3, filed on May 7, 1985; and co-pending application Ser. No. 860,307 filed on May 6, 1986, now abandoned, entitled "Process for the Removal of Nitrogen Oxides and Soot from Exhaust Gases of Diesel Engines", which corresponds to Federal Republic of Germany Patent Application No. P 35 16 360.7, filed on May 7, 1985, all of which are assigned to at least one of the same assignees as the instant application and are incorporated herein by reference as if the texts thereof were fully set forth herein.

BACKGROUND OF THE INVENTION

1. Field of the Invention

The invention relates to catalysts, and more particularly, to catalysts for the removal of nitrogen oxides from exhaust gases of combustion which are contaminated with dust.

The invention further relates to a catalyst for the separation of the nitrogen oxides from combustion waste gases containing dust by use of ammonia. The catalyst thus exhibits passages for the flow of exhaust gas, and is constructed of individual ceramic moldings, which exhibit a porous surface and a resistance to abrasion such that the dust in the exhaust gas flowing through the passages abrades the catalyst surface, whereupon the dust carries the abraded portions away.

2. Description of the Prior Art

Nitrogen oxides contained in exhaust gases from combustion equipment can be converted, by catalytic reduction using ammonia, into harmless nitrogen and water. For this purpose, the exhaust gases are customarily conducted over bulk catalysts with the simultaneous introduction of gaseous ammonia, liquid ammonia or ammonia dissolved in water.

If the exhaust gases contain large quantities of dust or soot, then the bulk catalyst used quickly becomes stopped up. If the exhaust gases also contain catalyst poisons, such as sulfur or chlorine compounds, then these substances deactivate the cata- lytically-active surfaces. This is especially true if catalysts are used which are sensitive to catalyst poisons Active catalyst substances and carriers which withstand the various catalyst poisons are expensive, and furthermore, such substances are difficult to dispose of because of their heavy metal content. Catalyst material which is easily disposed of, for example, in a blast furnace, that is, iron oxides, such as $Fe_2O_3$, have tendencies toward the above-mentioned catalyst poisoning.

Overall, therefore, dust and catalyst poisons cause the active surface regions of the catalyst to become blocked up quickly, so that the activity of the catalyst is reduced, although there is still active catalyst material below the deactivated surface layer of the catalyst.

Some examples of catalytic technology are found in U.S. Pat. No. 4,259,312, entitled "Process And Apparatus For Catalytically Reacting A Reducing Gas And Water Vapor"; U.S. Pat. No. 4,235,604, entitled "Method For Processing Coke Oven Gas"; and U.S. Pat. No. 4,049,777, entitled "Method Of Waste Gas Treatment", all of which are assigned the same assignee as the instant application.

Further examples of catalytic technology are found in U.S. Pat. No. 4,448,895, entitled "Process For Preparation Of Catalyst For Cleaning Exhaust Gases And Catalyst Prepared For The Process", and U.S. Pat. No. 4,503,162, entitled "Catalyst Systems For The Conversion Of Gases".

Examples of reactivation of catalysts useful in nitrogen oxide removal are described in U.S. Pat. No. 4,044,102, entitled "Method For Treating Exhaust Gases", and U.S. Pat. No. 4,043,939, entitled "Reactivation Of Catalysts Useful For Nitrogen Oxide Removal." All of the above-cited patents are incorporated herein by reference as if the texts thereof were fully set forth herein.

OBJECTS OF THE INVENTION

It is an object of the invention to provide a catalyst structure having a configuration which is simpler than that of the parent application.

It is a further object of the invention to provide a catalyst structure which is made up of molded pieces.

An object of the parent application and an embodiment of the present invention is to provide a catalyst which comprises an easily disposable material.

A still further object of the parent application and an embodiment of the present invention is to provide a catalyst in which the volume of catalyst material is almost completely used up during use.

SUMMARY OF THE INVENTION

In a catalyst of the type described in the present invention, objects of the invention are achieved in that the catalyst is constructed of flat plates which are preferably made by molding. These flat plates are arranged in parallel planes, and between which planes there are slits as passages. The production of such flat moldings is particularly simple. It has been shown, at least in some configurations of the flat moldings and the structure, that the desired abrasion takes place in the slits.

The present invention resides broadly in a catalytic structure for removal of nitrogen oxides from combustion exhaust gas containing dust. The catalytic structure comprises a plurality of plates. The plurality of plates are disposed to form a plurality of individual structures of plates which are disposed one from the other to form spaces thereinbetween for the exhaust gases to flow therethrough. At least a portion of the plates having openings therein. The openings in the plates are formed at least when the structures are assembled, such that the openings connect the spaces between at least one side of one of the structures of plates to another side of one of the structures of plates. The plates comprise a catalytic material. The plates have surfaces exposing catalyst to the gas. The combustion exhaust gas has a predetermined dust content entrained therein The catalytic material is formulated from predetermined components selected with regard to the predetermined dust content of the exhaust gas, to provide the catalytic material with a predetermined wear characteristic to abrasion by the dust entrained in the exhaust gas thereby reactivating the catalytic action of the catalytic ceramic material, by wearing away at the surfaces of the plates being fouled in use, at a predetermined rate related to the predetermined wear characteristic of the catalytic ceramic material and the predetermined dust content of the exhaust gas, whereby the abrasion of the surfaces of the plates proceeds at a predetermined rate in use, sufficient to abrade away a substantial portion of the surfaces fouled in use, whereby fresh catalyst surface is continuously exposed to the exhaust gas, and further whereby material abraded from the at least one surface of the catalytic ceramic material is at least partially carried away by the exhaust gas.

The moldings, according to the parent application, have three defined dimensions. They have a grid shape in cross section, whereby the penetration openings are formed by legs.

In a preferred configuration of the present invention, the width of each slit is approximately 2 to 4.5 times the plate thickness. It was found that with this ratio between plate thickness and slit width, the catalyst surface is continuously cleaned by abrasion, without an excessively rapid consumption of the catalyst.

In a preferred configuration of the present invention there are plinths formed on each plate by means of which it is in contact with a neighboring plate. Between the plinths, the plate exhibits a recess, which together with the edge of the adjacent plate, forms a penetration opening perpendicular to the flow direction in the slits. A dust flow enters through the penetration openings, which causes the dust particles to strike the plate surfaces at acute angles. The cleaning action of the plate surfaces is thereby improved.

In one refinement of the present invention, the plate exhibits a projection on the edge opposite the recess which fits between the plinths of the plate in contact with it. Plates in contact with one another are thereby prevented from sliding in the plate plane in relation to one another.

If combustion exhaust gases, which contain a quantity of dust, specifically coarse-grain dust which is not initially high enough to achieve the desired catalyst abrasion, are to be cleaned, the amount of dust is increased by adding dust.

The parent application, Ser. No. 768,508, achieves, at least partially, the objects with a catalyst of the type described above, in that the catalyst comprises individual ceramic bricks with porous surfaces and with passages for permitting a flow of exhaust gas therethrough. The bricks have some resistance to abrasion. The bricks are designed so that the dust of the exhaust gas flowing through the passages erodes the catalyst surface, whereby the dust takes the eroded material along with it.

In this manner, the active surface is continuously renewed. The catalyst thus has a life at a continuous or a constant high activity, which can be determined in advance. An easily disposable material can be used for the catalyst, the erosion from which can be disposed of together with the dust.

One embodiment of the parent application resides in a catalytic ceramic structure of at least one brick for use with ammonia for removal of oxides of nitrogen from an exhaust gas of combustion having dust contained therein, the ceramic material having at least one porous surface for being impinged by the exhaust gas: the ceramic material being formulated from predetermined components selected with regard to the dust content of the exhaust gas, to provide the ceramic material with a predetermined resistance to abrasion of dust entrained in the exhaust gas to reactivate catalytic action of the ceramic material at a predetermined rate of abrasion related to the predetermined resistance to abrasion of the ceramic material, whereby the abrasion proceeds at a predetermined rate in use, and further whereby material abraded from the ceramic material is carried away by exhaust gas.

In a preferred embodiment of the parent application, there are penetration openings transverse to the flow direction in the passageways. Between the individual bricks there is a pressure equalization, whereby large dust particles are diverted from a flow direction straight along the passages. The dust particles, therefore, strike the active catalyst surfaces at an angle, specifically at an angle preferably between about 10° and about 30°. This action improves the cleaning action.

Preferably, the bricks are between 10 centimeters (cm) and 50 cm long. As a result of the shortness of the bricks, the oblique striking action of the dust particles is improved.

BRIEF DESCRIPTION OF THE DRAWINGS

Preferred embodiments of the parent application are illustrated in the following drawings, in which.

A preferred embodiment of the present invention is illustrated in the following drawings.

DESCRIPTION OF THE PREFERRED EMBODIMENTS

A synopsis describing the catalyst as described in the parent application, Ser. No. 768,508, is presented herewith.

Its surface is continuously renewed by the dust abrasion. The catalyst also has a life span which is limited by abrasion and which can be determined in advance, throughout which it retains a uniform level of activity. A material which is easy to dispose of can be used for the catalyst, the abraded portions of which can be disposed of can be used for the catalyst, the abraded portions of which can be disposed of together with the dust. To improve the cleaning effect, in accordance with the parent application, there are penetration openings between the moldings, perpendicular to the flow direction in the passages. The penetration openings cause a deflection of dust particles from the direction of flow into the passages. These particles thereby strike the active catalyst surface at an acute angle.

FIGS. 1–5 show the embodiments of the parent application.

The bricks are produced from an initial substance with approximately the following composition:

TABLE A

| 88.7 | % of $Fe_2O_3$ | Iron Oxide |
|---|---|---|
| 3.2 | % of $Fe_3O_4$ | Iron Oxide |
| 0.11 | % of MnO | Manganese Oxide |
| 0.02 | % of CaO | Calcium Oxide |
| 4.5 | % of $SiO_2$ | Silicon Dioxide |
| 1.17 | % of $Al_2O_3$ | Aluminum Oxide |
| 0.01 | % of MgO | Magnesium Oxide |
| 0.04 | % of $TiO_2$ | Titanium Dioxide |
| 0.007 | % of $V_2O_5$ | Vanadium Oxide |
| 0.16 | % of $P_2O_5$ | Phosphorus Oxide |
| and traces of | As | Arsenic |
| | Pb | Lead |
| | Cu | Copper |
| | Cr | Chromium |

This substance gives the following reduction rate in percentages for stoichiometric ratios of the nitrogen oxide and at the following temperatures:

| Temperature | Reduction Rate |
|---|---|
| 300° C. | 93% |
| 360° C. | 97% |
| 390° C. | 94% |
| 400° C. | 95% | whereby the reduction rate is computed from the difference in the input and output oxides of nitrogen content, in relation to the oxides of nitrogen content on the input side.

It has been a surprising discovery that this substance, as described in Table A, which is in itself a mixture of ordinary catalyst substances, causes a substantial acceleration of the reaction of oxides of nitrogen.

A second substance with approximately the following composition was used to produce the bricks:

TABLE B

| 46% of $Cr_2O_3$ | Chromium Oxide |
|---|---|
| 28% of $Fe_2O_3$ | Iron Oxide |
| 15% of $Al_2O_3$ | Aluminum Oxide |
| 10% of MgO | Magnesium Oxide |
| 1% of $SiO_2$ | Silicon Dioxide |

With a stoichiometric ratio of the nitrogen oxide and the ammonia, the following reduction rates in percentages were obtained at the following temperatures:

| Temperature | Reduction Rate |
|---|---|
| 250° C. | 95% |
| 300° C. | 98% |
| 350° C. | 99% |

-continued

| Temperature | Reduction Rate |
|---|---|
| 400° C. | 95% |

Both the above substances where mixed together, depending on the application, to produce the bricks. Different mixtures of the two substances were prepared which exhibited the following reduction rates, in percentages, in relation to the characteristic following proportions of chromium oxide at the following temperatures:

| | Temperature | | | | |
|---|---|---|---|---|---|
| % of $Cr_2O_3$ | 250° C. | 300° C. | 350° C. | 400° C. | 450° C. |
| 10 | 72% | 95% | 98% | 97% | 95% |
| 5 | 65% | 93% | 97% | 98% | 98% |
| 1 | 55% | 82% | 93% | 98% | 98% |

For brown coal combustion, in which exhaust gas temperatures between 250° C. and 350° C. occur after the gas is exhausted from the combustion chamber, depending on the operating time of the furnace, the load case and design, a proportion of chromium oxide ($Cr_2O_3$) is selected in the mixture to be between 5 percent by weight and 20 percent by weight.

For melting chamber firings, for ballast bituminous coal which is burned at high temperatures, the exhaust temperatures, depending on the operating time of the furnace, the load case and the design, are typically approximately 350° C. to 450° C. The chromium oxide portion is for this case then set to less than 1 percent by weight.

Dry firings for high-value coal generally have exhaust temperatures in the range of 320° C. to 420° C. In this case, a mixture of both substances, from Table A and Table B, is used, in which there is a chromium oxide proportion of between 1 percent by weight and 5 percent by weight.

The mixture of the two above-mentioned substances contains relatively little $Al_2O_3$, but more $SiO_2$. That means that the $AL_2O_3$ exhibits only a slight tendency toward sulfate formation under the influence of sulfur trioxide. The $SiO_2$ with acid bonding contributes to a solid support structure for the bricks. It can be shown that specifically acid bonds of the mixture of substances make possible the formation of especially porous and solid bricks. Thin-walled, robust bricks can thereby be manufactured simply and economically. The production can take place, for example, by casting with a subsequent tempering, or, with the addition of an auxiliary agent, by extrusion with subsequent tempering.

With the various combustions, depending on the coal charge, dusts occur with different compositions. Depending on the different composition of the dusts and their differing physical consistency, the tempering temperatures are between 300° C. and 600° C., and acids are added to produce the catalyst. Suitable acids are $H_2SO_4$, $HNO_3$, $H_3PO_4$, HCl, HF or similar acids. These also immunize the catalyst against poisoning.

In stripping installations, an acidity of approximately 20% is selected. For brown coal, an acidity of 6% has proven favorable. For bituminous coal, an acidity of approximately 4% is preferably selected. For ballast coal, operations are conducted with an acidity of 2%. For dry combustion for high-value coal, the acidity can be lower than any of the aforementioned percentages.

The various dusts differ in their grain size distribution, among other things. Thus, for example, for dusts from the abovementioned melting chamber combustion, the average grain diameter is between 18 and 20 microns (1 micron = 1 micro meter which is equal to $10^{-6}$ meters). The smallest grain sizes are as low as 1 micron. The grain spectrum ends at 90 microns with no grains to be expected above the size. To prevent dust of the average grain diameter from clogging up the macropores of the catalyst, the average pore diameter of the catalyst is designed so that it is smaller than the average grain diameter of the dust. Preferably, the average macropore diameter of the catalyst is between one fourth and three fourths of the average grain diameter of the dust. It has been shown to be favorable when the average macropore diameter of the catalyst is approximately half as large as the average grain diameter. In the example described above, the average macropore diameter of the catalyst is approximately 10 microns. That means that dust particles which are just a bit larger accumulate over the pores and prevent the penetration of the finest dust parties into the pores by filtering. If a thick filter layer has accumulated, then it is eroded away by the dust flowing through the catalyst. That prevents the fine dust particles from penetrating densely and tightly into the macropores of the catalyst, from which they could only be removed at the expense of a very severe erosion of the catalyst.

If the large-grain fraction of the dust is not sufficient to loosen the filter layer, the coarse portion of the dust can be artificially increased. This can be done, for example, by omitting the fine-grinding or by a controlled addition of coarse-grained material. Such coarse-grained material, for example, sand or coarse-grain fractions of available fines, which can be extracted from the electrostatic filter, is preferably added to the gases after the combustion chamber, but ahead of the catalyst.

Figure 1:
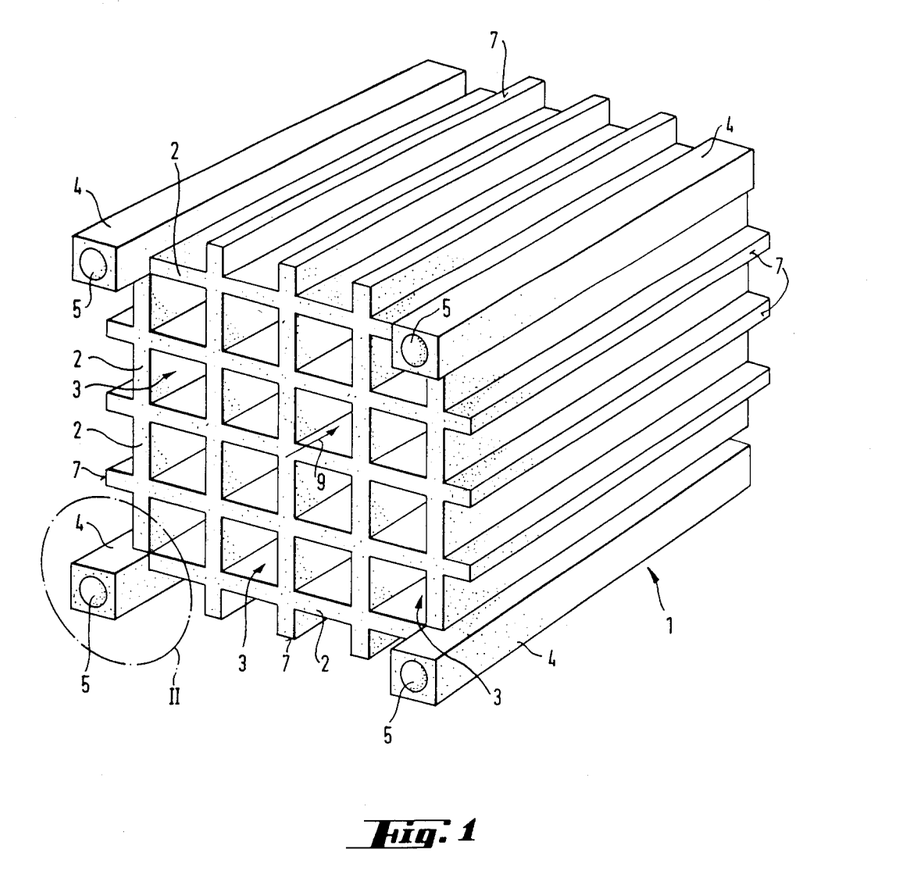
FIG. 1 shows a perspective view of a catalyst brick.

The catalyst brick produced from the above-mentioned substances takes the form of a checker brick 1, the length, width and height of which are preferably always between 10 centimeters and 50 centimeters.

In the checker brick 1, between webs 2, there are passages 3. The web thickness and the passage cross section are designed as a function of the gas throughput and the dust content. For a relatively low dust load of 20 milligrams to 350 milligrams dust/m³ of gas, a low web thickness of 2 millimeters to 3 millimeters is selected, and a small passage cross section, from web to web, of 8 millimeters to 10 millimeters square. Average passage cross sections, from the inside of one web to its opposite web, of 10 to 15 millimeters square, with a correspondingly larger web thickness, are selected for a dust throughput of 350 milligrams to 25,000 milligrams of dust/m³ of gas. Large passage cross sections, from web to web, of 10 to 20 millimeters square, with correspondingly larger web thicknesses, are selected for dust concentrations of 25,000 to 50,000 milligrams of dust/m³ of gas.

Figure 2:
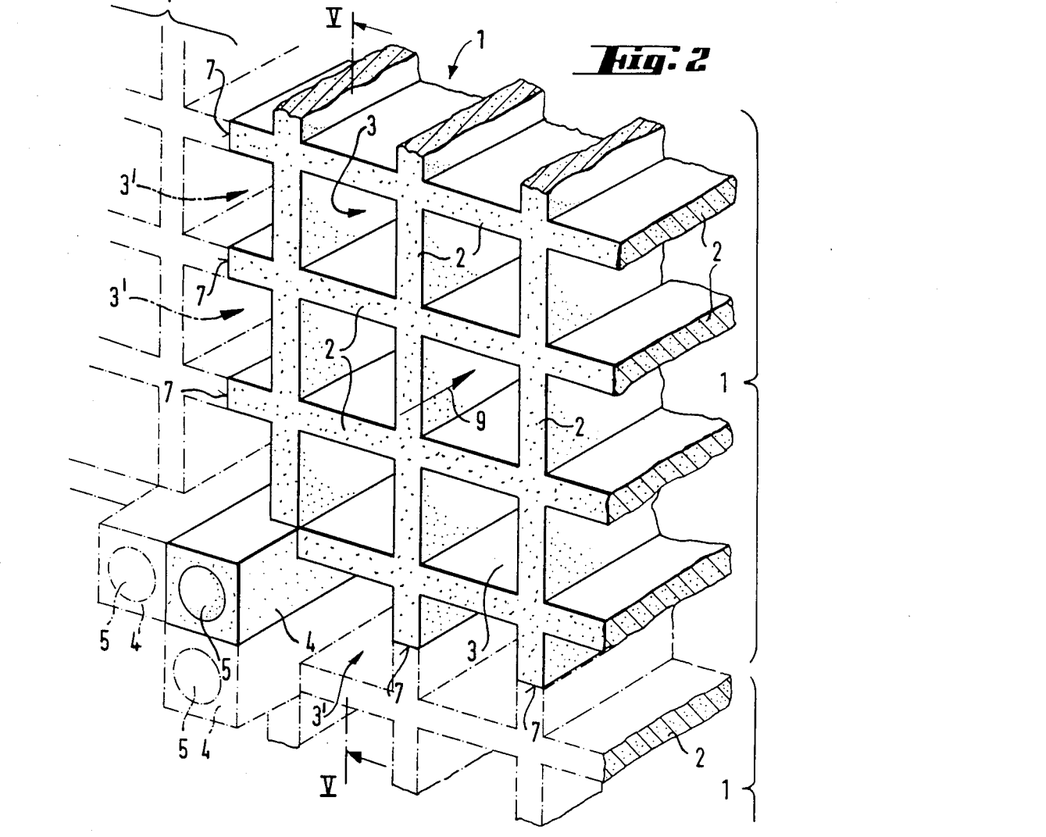
FIG. 2 shows an enlarged perspective view of a corner region of the brick illustrated in FIG. 1.
Figure 3:
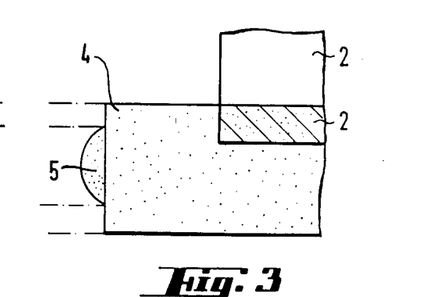
FIG. 3 shows a side view of one end of a leg of the brick.
Figure 4:
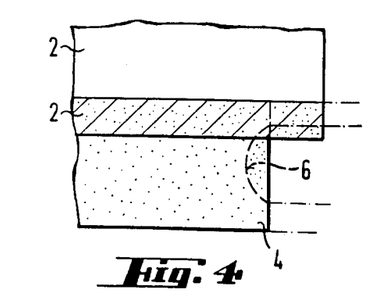
FIG. 4 shows a side view of the other end of a leg of the brick.
Figure 5:
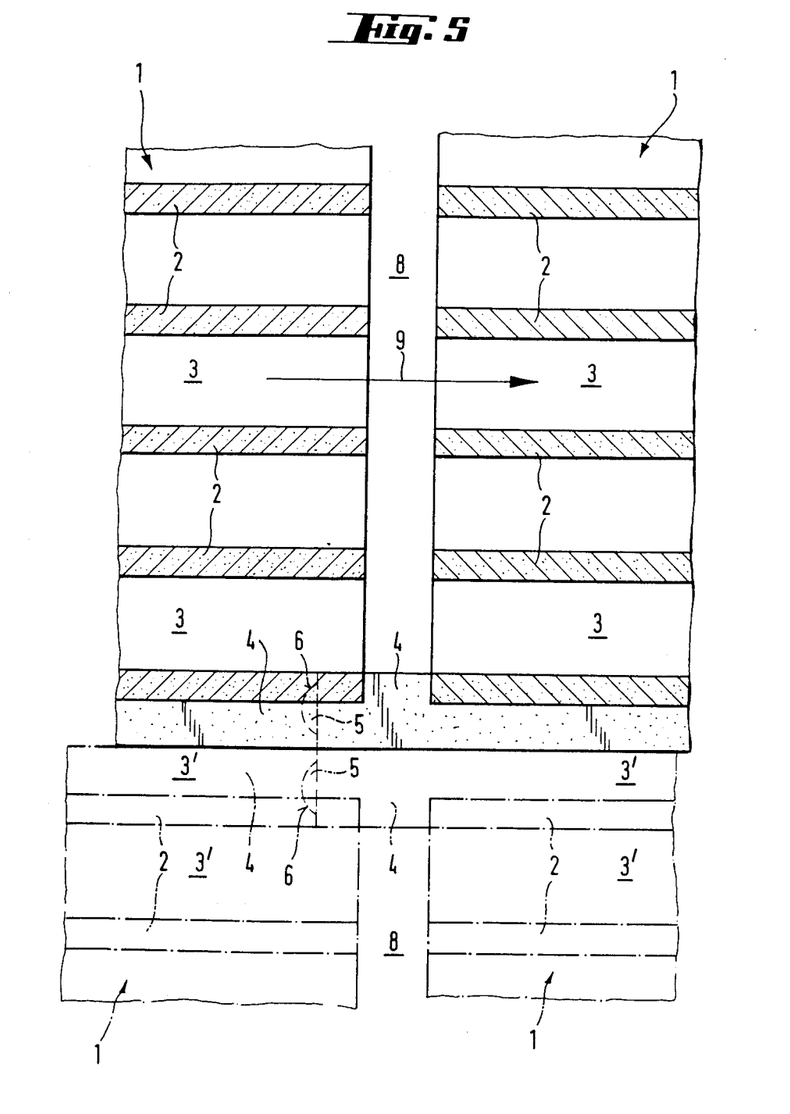
FIG. 5 shows a detailed cross-sectional view as seen from one side, through two catalyst bricks which are disposed adjacent one another.

The checker brick 1 has, at its corners, legs 4 which project beyond the webs 2, as shown in FIGS. 2 and 5. The legs 4 project out from the webs 2, either at both end surfaces, at which the passages 3 are open, or only on one end surface. On one end of each leg 4, there is a centering projection 5. A corresponding recess 6, to receive the projection 5, is found on the other end of each leg 4.

The webs 2, which extend from an outer surface of the checker brick 1, form contact surfaces 7 on the outside of the checker brick 1, which lie in the alignment of the legs 4. If checker bricks 1 are set close to one another, passages 3' are also formed between neighboring checker bricks.

To construct the catalyst, the checker bricks 1 are placed close to one another (see FIGS. 2 and 5). On the layer of checker bricks thus formed, several more layers or sections of checker bricks are laid, whereby the centering projections 5 of the checker bricks 1 in one layer fit into the recesses 6 of the legs 4 of the checker bricks of the next layer. Spaces are thereby formed between the webs 2 of the checker brick layers, which are determined by the length of the legs 4. The legs 4 are designed so that the distance between the layers is between 5 millimeters and 100 millimeters. As a result of this structure, penetration openings are formed between the layers of checker bricks transverse to the direction of flow in the passages 3.

In practice, it is to be expected that different pressures will build up in the passages 3, either because of manufacturing tolerances or because of different amounts of dust deposited in the passages 3. The penetration openings transverse to the direction of flow in the passages 3 cause a pressure equalization after each layer or column of bricks. As a result of this pressure equalization, the gas and dust quantities flowing through the passages 3 receive a flow component transverse to the direction of flow in the aligned passages 3 of the layers of checker bricks. Especially large dust particles thereby have been formed to be diverted by an acute angle, of between 10° and 30°, toward the walls of the catalyst. The result is that dust fines adhering to the surface of the catalyst and closing the pores are eroded away by the coarser dust. If, for example, chloride or sulfate formations have accumulated, causing inactive surfaces and surfaces having decaying activity on the catalyst, then these surface areas are worn away by the coarse dust. It has been shown that the depth of a catalyst layer which has become inactive is approximately 0.002 millimeters, so that it can be easily worn away by the dust flowing through the passages 3. After the erosion of the catalyst surface, there is always fresh catalyst surface available until the catalyst is completely worn away. The catalyst therefore exhibits a self-cleaning action when exposed to dust.

The catalyst erosion is conducted with the dust for use as flue dust. Worn checker bricks can be replaced and easily disposed of in a blast furnace.

It has been shown that a daily cleaning of the passages is sometimes sufficient by blowing with outside agents, such as steam or air. During the cleaning, care is to be taken that excess pressure does not drive the dust fines into the pores of the catalyst. The penetration of liquid or condensation phenomena in the catalyst should be avoided, since the dust fines then tend to cause cementation.

In the context of the invention, there are numerous other embodiments. Thus, for example, the cross section of the passages can also be web-shaped or round. Care is to be taken that the length of the passages is not so long that the deflection of the coarse dust caused by the pressure equalization between the checker bricks does not cause any significantly oblique dust contact with the surface of the catalyst. The layer of checker bricks which is closest to the entrance of the exhaust gas containing the dust, is exposed to particularly severe wear. To prevent premature wear, checker bricks should be used there which have been acid-treated for a hardness which is greater than the checker bricks of the other layers.

Figure 6:
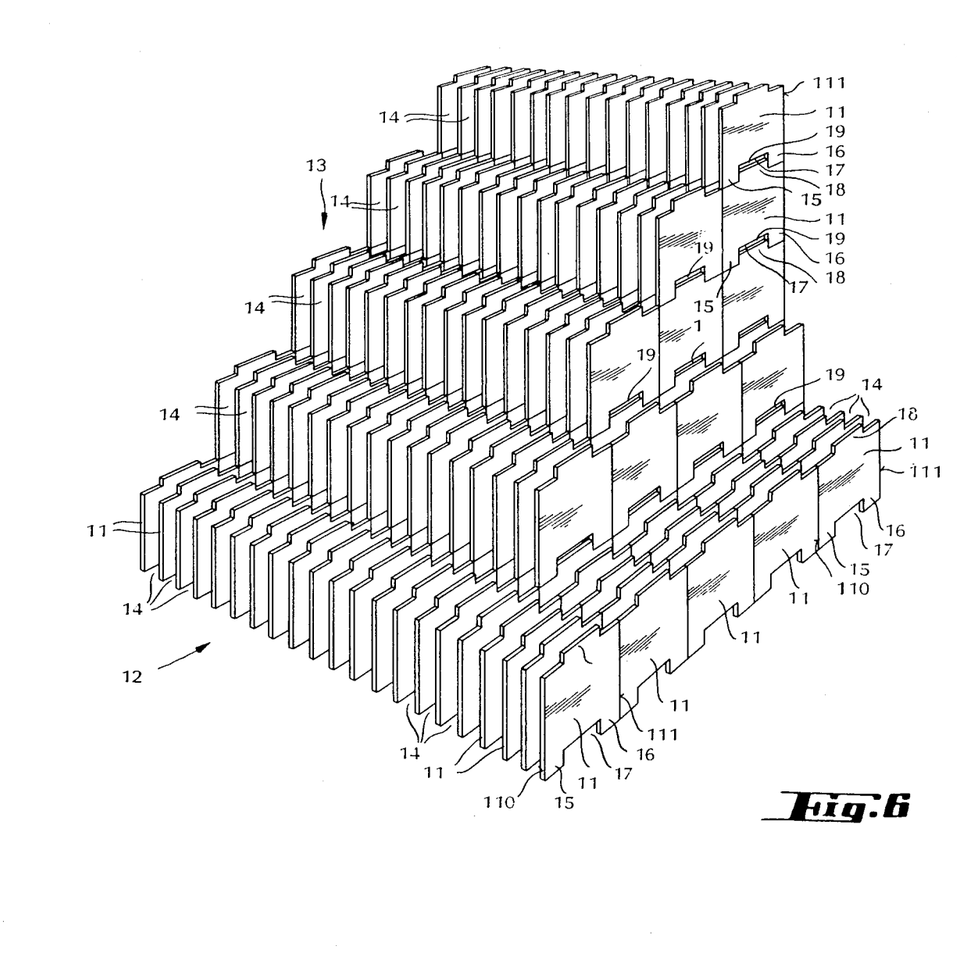
FIG. 6 shows a partial perspective view of a catalytic structure according to an embodiment of the invention.

In FIG. 6 a preferred embodiment of the present invention is shown, as follows:

The catalyst is made up of a number of identical plates 11. These plates 11 are arranged in several horizontal rows 12 and several vertical columns 13. The plates 11 in the rows 12, and the columns 13 are arranged in parallel vertical and horizontal planes. Between the vertical planes there are slits or spaces 14. The width of the spaces 14 is approximately 2 to 4.5 times the thickness of the plates 11. It has been found that the desired results, according to the invention, can also be achieved with 2 to 4.5 times the width of the spaces 14 in relation to the thickness of the plates 11.

The plates 11 are preferably about one millimeter thick. However, the plates 11 may alternately be about a few to several millimeters thick. In some embodiments, the plates may be as great as an inch thick or even a few inches thick. The length and height of the plates 11 are preferably about ten or more times the thickness of the plates 11 and may be even twenty, thirty or even one hundred times that of the thickness. The thickness of the plates 11 may also be essentially the same as the webs and regions of the bricks 1 described above.

A typical one of the plates 11 preferably exhibits plinths 15 and 16 on its lower edge between which there is a recess 17. On its upper edge, each individual one of the plates 11 is provided with a projection 18 the length of which corresponds to the length of the recess 17. The material of the plates 11 may also be of the same material described for use in making the bricks 1. The height of the projection 18 is less than the height of the recess 17, so that there is a penetration opening 19 between two plates 11 on top of one another. Two neighboring slits or spaces 14 are connected to one another via the penetration openings 19. The length of the recess 17 is preferably about one half the width of the plates 11. The projection 18 is preferably three to five or even ten times the thickness of the plates 11.

The plates 11 abut, one against the other, along rectangle edges 111. The vertical ends 110 of the plates, which do not abut against any adjacent plate 11, may abut against a containment structure (not shown), which may comprise a box like structure for containing the plates 11.

The plates 11 are preferably supported at the bottom of the structure by a plate having perforations extending therethrough to allow the exhaust gases to readily pass through the plate (not shown).

The plinths 15 and 16 of an upper one of the plates 11 are in contact with both the projection 18 of a lower plate and with the lower plate itself. Two plates on top of one another are thereby prevented from slipping, in relation to one another.

The lateral edges running between the upper edge and the lower edge are preferably straight, so that the plates 11 are in close contact with one another in the horizontal rows.

Figure 7:
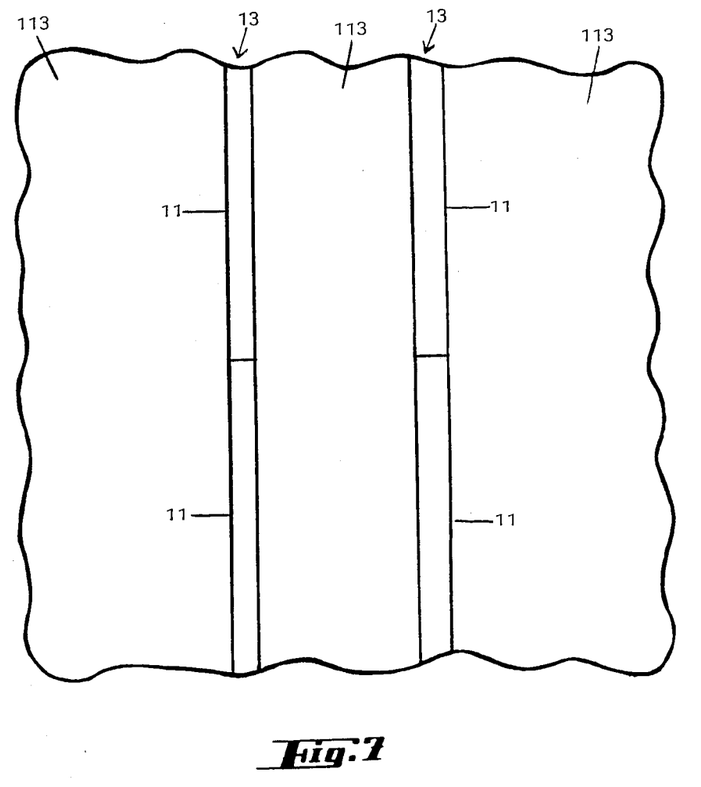
FIG. 7 shows a front view of the support structure for FIG. 6.

The plates 11 are prevented from abutting up against one another by spacers, which are shown in greater detail in FIG. 7, and may be vertical columns disposed between each vertical column of plates 11, which preferably support the plates 11 horizontally.

In operation, the slits or spaces 14 preferably carry a vertical flow of combustion exhaust gases. The dust contained in the combustion exhaust gas causes a continuous abrasion of the plates. On account of pressure differences in the individual slits or spaces 14, the flow also travels through the penetration openings 19, so that a flow component directed toward the plate surface is imparted to the dust, thereby increasing the abrasion of the surface of the plates 11. The flow of exhaust gases preferably flows from the top of the structure of plates 11 to the bottom thereof. Alternatively, the exhaust gases may flow from the bottom to the top of the structure or horizontally from the front to the back thereof or vice versa. In the case of the flow from the top to the bottom of the structure, the abraded particles easily fall down to an area (not shown) below the structure where the dust and particles may be removed. The plates 11 may be made from any of the materials disclosed in this application. Other directional flows may also be used.

FIG. 7 shows a front view of FIG. 6 as seen from the general direction of the arrow designated by 13, which represents the horizontal rows. Between the plates 11, disposed in columns 13, spacers 113 are vertically disposed, preferably at the vertically abutting vertical edges 111 thereof.

The spacers 113 support the columns 13 of plates 11 so that the plates 11, disposed one next to the other, are not easily displaced horizontally, thereby disturbing the even placement of the plates 11 and the preferable substantial equality in the width of the slits or spaces 14. The spacers may be made from a material similar to the plates 11 or any other appropriate material such as a metal, for example, iron or steel.

Figure 8:
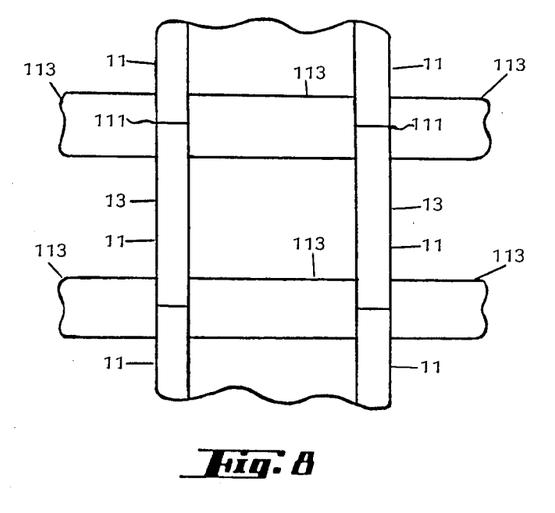
FIG. 8 shows a top view of the support structure for FIG. 6.

FIG. 8 shows a top view of the structure of plates 11 with the vertical spacers 113 adjacent the edges 111.

If the gases were to lie directed through the structure horizontally, the spacers 113 could be disposed horizontally in the middle sections of the plates 11.

The invention as described hereinabove in the context of the preferred embodiments is not to be taken as limited to all of the provided details thereof, since modifications and variations thereof may be made without departing from the spirit and scope of the invention.

What is claimed is:

1. A catalytic structure for removal of nitrogen oxides from combustion exhaust gas containing dust, said catalytic structure comprising:

a plurality of plates, said plurality of plates being disposed to form a plurality of individual structures of plates which are disposed one from the other to form spaces therebetween for the exhaust gases to flow therethrough;

at least a portion of said plates having openings therein;

said openings in said plates being formed at least when said structures are assembled, such that said openings connect the spaces between at least one side of one of said structures of plates to another side of said one of said structures of plates;

said plates comprising a catalytic ceramic material;

said plates having surfaces exposing catalyst to said gas;

said combustion exhaust gas having a known dust content entrained therein; and said catalytic material being formulated from components selected with regard to said known dust content of said exhaust gas, to provide said catalytic material with a wear characteristic to abrasion by said dust entrained in said exhaust gas thereby reactivating said catalytic action of said catalytic ceramic material, by wearing away at said surfaces of said plates being fouled in use, at a rate related to said wear characteristic of said catlytic ceramic material and said dust content of said exhaust gas, whereby said abrasion of said surfaces of said plates proceeds at a given rate in use, sufficient to abrade away a substantial portion of said surfaces fouled in use, whereby fresh catalyst surface is continuously exposed to said exhaust gas, and further whereby material abraded from said surfaces of said plates of said catalytic ceramic material is at least partially carried away by said exhaust gas.

2. The structure according to claim 1 wherein said plates have a given thickness and wherein said spaces between said structures of plates are approximately 2 to approximately 4.5 times said plate thickness.

3. The structure according to claim 1 wherein said plates have plinths which engage with neighboring plates, and at least some of said plates have recesses between the plinths, which together with an edge of a neighboring plate forms said openings between said spaces.

4. The structure according to claim 2 wherein said plates have plinths which engage with neighboring plates, and at least some of said plates have recesses between the plinths, which together with an edge of a neighboring plate forms said openings between said spaces.

5. The structure according to claim 3 wherein at least one plate has a projection on the edge opposite the recess, which fits between the plinths of the plate which is contact with them.

6. The structure according to claim 4 wherein at least one plate has a projection on the edge opposite the recess, which fits between the plinths of the plate which is contact with them.

7. The structure according to claim 3 wherein said plates exhibit two plinths.

8. The structure according to claim 4 wherein said plates exhibit two plinths.

9. The structure according to claim 7 wherein the two lateral edges of said plates run in parallel straight lines.

10. The structure according to claim 4 wherein the two lateral edges of said plates run in parallel straight lines.

11. The structure according to claim 1 wherein said catalytic structure is for use with ammonia.

12. The structure according to claim 2 wherein said catalytic structure is for use with ammonia.

13. The structure according to claim 3 wherein said catalytic structure is for use with ammonia.

14. The structure according to claim 1 wherein said plates comprise at least one iron oxide.

15. The structure according to claim 10 wherein said plates comprise at least one iron oxide.

16. The structure according to claim 11 wherein said plates comprise at least one iron oxide.

17. The structure according to claim 14 wherein said at least one iron oxide comprises $Fe_2O_3$.

18. The structure according to claim 1 wherein said structures of plates are disposed in substantially parallel planes.

* * * * *